March 19, 1974

F. MANZANILLA ET AL  3,798,157

PROCESS FOR THE REMOVAL OF CONTAMINANTS
FROM HYDROCRACKING FEEDSTOCKS

Original Filed Oct. 28, 1970

INVENTORS.
FERNANDO MANZANILLA
ARMANDO MANJARREZ
LINO CONROY
JULIO LARA

By White, Haefliger & Bachand
ATTORNEYS.

United States Patent Office 3,798,157
Patented Mar. 19, 1974

3,798,157
PROCESS FOR THE REMOVAL OF CONTAMINANTS FROM HYDROCRACKING FEEDSTOCKS
Fernando Manzanilla, Armando Manjarrez, and Lino Conroy, Mexico City, and Julio Lara, Edo. de Mexico, Mexico, assignors to Instituto Mexicano del Petroleo, Mexico City, Mexico
Continuation of abandoned application Ser. No. 84,853, Oct. 28, 1970. This application May 10, 1973, Ser. No. 358,841
Int. Cl. C10g 21/40
U.S. Cl. 208—251  2 Claims

ABSTRACT OF THE DISCLOSURE

The elimination of metallic poisons for hydrocracking catalysts and asphaltene and like polymer fractions from feedstocks is achieved rapidly and effectively by adding to the feedstock insoluble finely particulate matter, e.g. talc or asphaltene in quite minor amount, combining the metallic compounds and polymer fractions into gravity separable agglomerates and separating the agglomerates and the desired fraction of the feedstock.

---

This is a continuation of application Ser. No. 84,853, filed Oct. 28, 1970 and now abandoned.

BACKGROUND OF THE INVENTION (1) Field of the invention

This invention has to do with a method of obtaining rapidly a desired hydrocarbon fraction, one suitable for conversion by hydrocracking, for example into gasoline and highly soluble intermediates from a relatively low grade, heavy crude feedstock which contains troublesome quantities of asphaltic and metalliferous compounds, materials which are deleterious to cracking operations either by poisoning the catalyst, clogging equipment or coking during processing.

Specifically, the invention is concerned with a novel manner of separating these deleterious materials which enables their substantially complete separation and rapidly. In general, the feedstocks advantageously treated by the present method are those commonly referred to as asphalt type bituminous materials which are the residue obtained or produced from the refining of e.g. hydrocarbons such as crude oils, neutral asphalts, bitumens and pyrobitumens obtained, for example from distillations, deasphalting operations, petroleum cracking processes and the like and their derivatives obtained by blowing these hydrocarbons with air or an oxygen containing gas, sometimes with the added use of catalysts. While there are compositional variations and physical and chemical differences in these materials, characteristically they contain oils, resins and asphaltenes.

Oils are the lower molecular weight, less complex component of these materials and are desirably recovered for conversion into higher price products. The resin fraction so-called is nonpolymeric and is typically soluble in petroleum naphtha, chloroform, carbon bisulfide and benzene. The asphaltene fraction, which is the deleterious and difficultly separable component is comprised of polymers of high molecular weight so as to be insoluble in petroleum ether and only slightly soluble in petroleum naphtha and alcohol while being soluble in benzene, chloroform and carbon bisulfide. The asphaltenes are often enclosed within the resins which resins tend to polymerize to form additional asphaltenes.

In addition, these materials may contain metalliferous compounds, i.e. organometallics having nickel, vanadium, iron, copper and like metal radicals. The first two of these metals are particularly troublesome in that they tend to deactivate or "poison" catalysts commonly and desirably used in hydrocracking operations.

The processing of feedstocks containing above 2% by weight asphaltenes and 90 p.p.m. (parts per million) of metal ion, e.g. nickel and/or vanadium has not been economical due to catalyst poisoning by the metals and coking of the metal compounds and asphaltenes too early in the life cycle of the catalyst.

(2) Prior art

The solution of the problem is to remove the unwanted fraction of the feed and process only the remainder. Thus far, this solution has been afforded only by methods so costly in relation to benefits gained as to make them prohibitive of use. Among methods heretofore attempted have been a two-step approach in which in a first step heavy materials are hydrocracked with a first catalyst or by temperature only to less complex and lower boiling products which may be economically processed to highly soluble products with more active catalysts in a second step. This method is limited to feedstocks relatively low in asphaltenes and metals to start with and will not be useful where asphaltene content is 2% by weight of the feedstock or more and/or above 25 p.p.m. of polyvalent metal is present. Visbreaking is a hydrocarbon process for the obtaining of gasolines and like high grade intermediates from heavy residue, but the concomitant high production of coke and tar precludes its use where deleterious materials are present in relatively great quantity. Thermal cracking at high temperatures with the use of a hydrogen donor diluent will minimize coking but also not economically convert residue with high contents of asphaltenes.

The most promising approach has been the elimination of asphaltenes and metals from residual feedstocks prior to hydrogenation and/or hydrocracking procedures in order to obtain highly soluble products. In particular, asphaltenes may be isolated by sequential selective extraction techniques, taking advantage of the different solubility of the asphaltene from oils and resins. In this method, the asphaltenes settle from the mixture but only very slowly because of the flocculent nature of the asphaltene particles and are therefore difficult to eliminate rapidly or completely. Acceleration of settling has been attempted with such expedients as centrifugation of asphaltene suspensions, effective but too costly; filtration, not acceptable because of the flocculent asphaltenes tend to compaction, clogging filters and unduly lengthening separation times, with or without filter aids which latter themselves pose a separation problem from the filtered asphaltenes although they hasten filtering; increased temperatures up to the limits dictated by the extracting solvents, but this causes turbulence which is counter-productive to more rapid asphaltene settling; dilution of the precipitate, but prior methods have made no provision for solvent recovery or obtained solution use and thus have been too costly to consider commercially satisfactory; and counter-current extraction which is effective but unduly expensive for presently contemplated plant design.

SUMMARY OF THE INVENTION

The present invention has for its major objective, the provision of a method of separating asphaltenes and like polymer components and/or metalliferous compounds from a feedstock comprising asphalt type bituminous materials rapidly and inexpensively essentially through the use of finely divided particulate matter added to the feedstock, suitably with prior solvent dilution, to effect agglomeration of the asphaltenes and/or metalliferous compounds which ever is present or both, into gravity separable size and weight. Thus, the flocculent nature of asphaltenes is turned to advantage to aggregate the individual asphaltene particles together about an added nucleus of a finely divided material particulate. The precipitated materials are readily separated; the desired, oily fraction, and resin if desired, may be decanted from the precipitate.

In particular, the invention provides a method for obtaining rapidly a desired hydrocarbon fraction suitable for catalytic cracking operations from a feedstock comprising the desired fraction and dispersed therein polymeric materials, organometallic materials or mixtures thereof which are deleterious to such operations, which includes the steps of adding feedstock insoluble finely particulate matter less than 200 mesh in particle size to the feedstock in an amount up to about 5% by weight of the feedstock, combining the deleterious materials therewith into gravity separable agglomerates and separating the agglomerates and the desired fraction in the feedstocks.

In a specific embodiment, the present method of processing feedstocks may include processing a feedstock containing above 25 p.p.m. metallic catalyst poisons and above 2% asphaltenes to obtain a desired fraction useful in catalylic cracking operations including diluting the feedstock with from 2 to 10 volume of feedstock of a liquid $C_3$ to $C_8$ solvent for the desired fraction, passing the diluted feedstock into a vertically extended processing zone at a feed point intermediate the top and bottom of the zone, adding from 1 to 5% by weight based on the feedstock weight of particulate matter less than 200 mesh in particle size to the zone at a point above the feed point and below the top of the zone, agglomerating the metallic poisons and asphaltenes with the added particulate matter to gravity separate to the bottom of the zone from the diluted feedstock, taking a solution of the desired fraction in the solvent diluent from the top of the zone, taking agglomerated metallic poisons and asphaltenes from the bottom of the zone, recovering the solvent diluent from the desired fraction solution, recycling the solvent to dilute fresh feedstock and recycling separated asphaltenes less than 200 mesh in particle size to the processing zone as added particulate matter.

Other specific features of the present method include processing feedstocks containing above 2% by weight asphaltenes as the polymer fraction and above 25 p.p.m. of metals such as vanadium and nickel, the use as particulate matter of asphaltene and/or metal compounds having a particle size above about 350 mesh and preferably between 250 and 300 mesh and in amounts between 1 and 5% and preferably 2% of the feedstock weight, diluting the feedstock with from 2 to 10 volumes and preferably 3 to 6 volumes of solvent for the feedstock oily fraction in which the added particulate matter is insoluble, adding the particulate matter dispersed in the solvent diluent, gravity separating the agglomerated polymers and metallic poisons, and employing a liquid organic solvent having from 3 to 8 carbon atoms.

DESCRIPTION OF THE PREFERRED EMBODIMENTS

Figure 1:
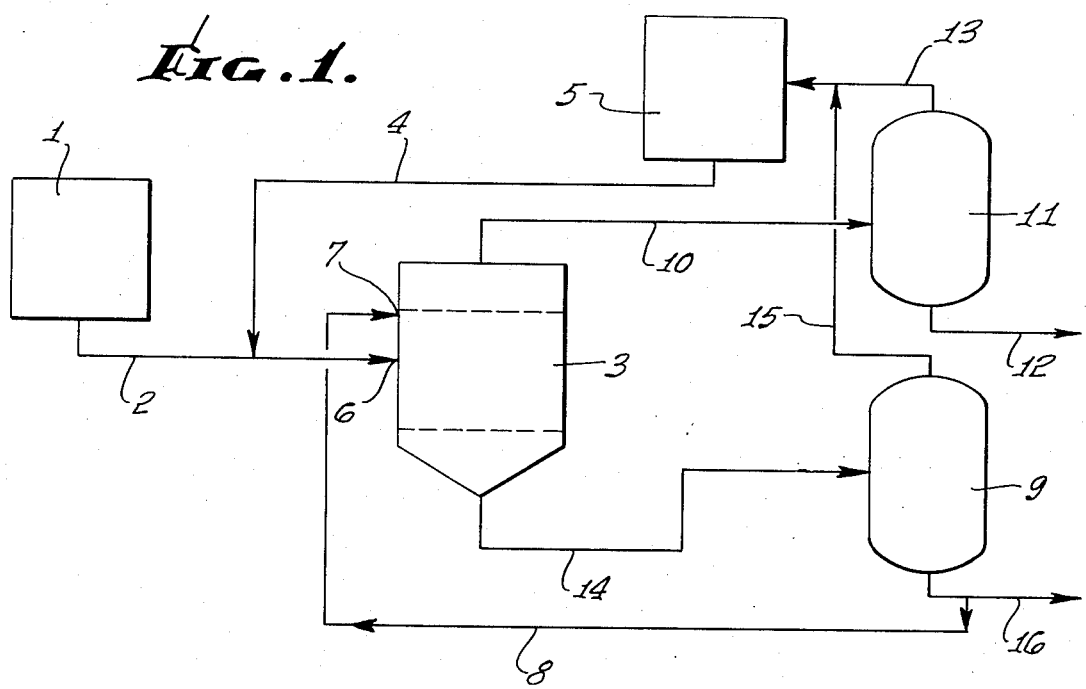
FIG. 1 is a flow sheet of the present method in a preferred embodiment.

The present method is useful in preparing various feedstocks for hydrocracking, thermally or catalytically, by eliminating therefrom deleterious components to such processing. In general, the feedstocks advantageously treated by the present method are those termed asphalt type bituminous material residue, described above to contain a desired oily fraction, a resinous fraction which is nonpolymeric and may be processed to higher grade products and a polymeric component generally comprising asphaltenes, polymeric particulate matter of a flocculent nature, which is deleterious when present in refining operations but which may be useful per se in low grade applications.

In carrying out the method in its essential aspects, the feedstock comprised as indicated is mixed with finely divided particulate matter; the asphaltenes by nature agglomerate about this matter as the matter provides nuclei for agglomerates of asphaltenes, and the agglomerates settle from the remainder of the feedstock, the oily portions are then removed to further processing.

The added particulate matter acts in a physical manner and thus its specific composition is not narrowly critical. Costly or aggressive chemicals are desirably avoided. Among useful materials widely available at low cost and noninjurious to the asphaltene product or processing equipment are minerals such as asbestos, silicas, e.g. diatomaceous earth, quartz, ground silicas and pyrogenic silicas, glass particles, silicates, e.g. mica, clay, talc, calcium silicate, nephline syenite, metal oxides, e.g. alumina, alumina trihydrate, sapphire, titanium dioxide, as well as calcium carbonate, e.g. ground chalk or precipitated chalk, barium ferrite, barium sulfate, boehmite, vermiculite, perlite, carborundum and the like, wood flour, ground bark, keratin and carbon.

Highly advantageous as the nucleating particulate material is asphaltene itself which when superadded to a feedstock, e.g. on recycle from earlier separations, functions to promote agglomeration of additional asphaltene and thus to facilitate separation of asphaltene and desired fractions of the feedstock.

To function suitably, the particulate matter need be added only in small amounts, e.g. less than 5% by weight, based on the weight of the feedstock. Normally 1 to 5% by weight and typically 2% by weight will be used. Use of greater amounts, e.g. up to 15%, increases settling but such benefits in rate of settling of asphaltenes are generally not proportionate to the increased amounts of added matter.

The added particulate matter is finely divided. This means an average particle size less than about 200 mesh (Tyler Standard Screen Scale), i.e. less than 74 microns and smaller down to 350 mesh. Matter in the range of 250 to 300 mesh is highly satisfactory.

The use of the finely divided particulate matter comprises essentially contacting the matter with the feedstock. Any form of contactor may be used which is able to distribute the matter through a feedstock mass without undue agitation of the mass which would impede settling.

In the preferred forms of the method, a liquid diluent for the feedstock is used to lower feedstock viscosity and thus improve agglomerate settling rates. Suitably, the diluent is a solvent for the desired, oily fraction of the feedstock. In this connection, normally liquid organic materials are useful. Among these there may be mentioned diethyl ether, propylene oxide, n-pentane, ethyl bromide, methylene chloride, methylal carbon disulfide, ethyl formate, acetone, methyl acetate, ethylidene dichloride, acetylene dichloride, chloroform, methyl alcohol, tetrahydrofuran, di-isopropyl ether, n-hexane, isobutyl chloride, trichloroethane, dioxolane, carbon tetrachloride, ethyl acetate, n-butyl chloride, ethyl alcohol, methyl-ethyl ketone, 2-methyl tetrahydrofuran, benzene, cyclohexane, n-propyl formate, acetonitrile, isopropyl alcohol, tert-butyl alcohol, cyclohexene, ethylene chloride, thiophene, trichloroethylene, isopropyl acetate, isobutyl bromide, 2,5-dimethyl furan, ethyl chloroformate, allyl alcohol, 1,2-dichloropropane, n-propyl alcohol, n-heptane, ethyl propionate, sec-butyl alcohol, isoamyl chloride, formic acid, methylcyclohexane, dioxane, nitromethane, n-propyl acetate, diethyl ketone, tert-amyl alcohol, acetyl, n-butyl formate, isobutyl alcohol, acetylene dibromide, toluene, sec-butyl acetate, trichloroethane, nitroethane, pyridine, pentan - 3 - ol, epichlorohydrin, n-butyl alcohol, isobutyl acetate, methyl isobutyl ketone, acetic acid, propylene glycol monomethyl ether, ethyl-n-butyrate, 2-nitropropane, isoamyl bromide, tetrachloroethylene, diisopropylene ketone, ethylene glycol diethyl ether, ethylene glycol monomethyl ether, n-octane, n-butyl acetate, diethyl carbonate, sec-propylene chlorohydrin, mesityl oxide, ethylene bromide, 1-nitropropane, 2-methyl-pentan-4-ol, iso-butyl carbinol, chlorobenzene, xylene and the like. Highly suitable are diluents having 10% of the vicosity of the feedstock or less.

Preferred diluents are hydrocarbons containing from 3 to 8 carbon atoms inclusive which are solvents for the desired feedstock fraction, e.g. pentane, hexane, heptane and octane, benzene, toluene and xylene.

The diluent-solvent is added to the feedstock before, with or after addition of the finely divided particulate matter; conveniently, the particulate matter is dispersed in the diluent-solvent in which it is necessarily insoluble for ready dispersal into the feedstock.

The volume of diluent added is generally at least equal to the feedstock volume, i.e. one volume of diluent-solvent for each volume of feedstock. Improved rates of asphaltene separation are realized with higher ratios of diluent-solvent volume to feedstock volume. Typically, at least 2 volumes and preferably 3 to 6 volumes of diluent-solvent are employed per volume of feedstock. Higher ratios, e.g. to 10 volumes of diluent-solvent per volume of feedstock and higher may be used where the economics of solvent investment and handling justify.

The feedstock/diluent/particulate matter mixture is blended, preferably without turbulence but intimately. Characteristically, the asphaltenes form into agglomerates about the added particulate matter or simply with one another into masses which will settle by gravity through the feedstock, particularly rapidly where the feedstock has been diluted to 4 to 7 times its original volume through the addition of a diluent as described.

Characteristically too, metalliferous compounds, i.e., organometallic compounds which contain the active metals in the feedstock in chemically combined form, especially nickel and vanadium which are known to act as poisons to hydrocracking catalysts, combine into agglomerates like the asphaltenes and therewith so that these deleterious components of the feedstock are also and simultaneously removed, meaning that the present method achieves a difficult dual separation in a facile manner.

Temperature of the feedstock during agglomeration is not narrowly critical and should be high enough to have a suitably low viscosity in the feedstock mixture, but low enough to not cause boiling and resulting turbulence in the mixture. Specific temperatures will depend on the feedstock and diluent composition and typically be more than 50° C. below the boiling point of the diluent at operating pressures. In addition, the mixture temperature should not exceed the melting range of the asphaltenes, usually above 300° C.

A typical flow scheme for practicing the present method is shown in FIG. 1. With reference to the figure, the feedstock from supply 1 is passed along line 2 to contactor 3, a vertically elongated vessel equipped with mechanical agitating means such as a paddle, not shown. Prior to entry into the contactor 3, the feedstock in line 2 is blended with solvent/diluent passed along line 4 from supply tank 5 and in predetermined volume ratios. The feed point 6 for feedstock in line 2 is approximately at the middle level of the contactor 3. At point 7 above the feed point 6, a supply of particulate matter is added to the contactor 3 along line 8 from a supply thereof in tank 9.

The contactor 3 may be considered to contain three phases: the upper "I" phase comprises solvent/diluent and the oily fraction of the feedstock and possibly resins, the intermediate "II" phase comprises the unfractionated feedstock, solvent/diluent and particulate matter and the lower "III" phase comprises precipitated particulate matter and agglomerated asphaltenes and organometallic compounds and some solvent/diluent.

The I phase is drawn off overhead through line 10 to separator 11 where the oily feedstock fraction is separated from the solvent/diluent and passed as bottoms along line 12 to further processing, e.g. a hydrocracking operation, while the solvent/diluent is passed overhead through line 13 to solvent/diluent supply tank 5 for recycle through line 4 to the feedstock in line 2. The described recovery of solvent is an economic advantage of this embodiment of the method.

The III phase is passed from the contactor as bottoms along line 14 to separator 9 where some solvent is stripped off and passed along line 15 to solvent/diluent supply tank 5 for reuse. The bottoms in separator 9 is passed out of the system along line 16. A fraction of the separator 9 bottoms is passed into line 8, e.g. as a fluent mixture of asphaltenes less than 200 mesh in average particle size in sufficient solvent/diluent to make passage through line 8 practicable, and returned to contactor 3 as the addition of particulate matter.

EXAMPLE 1

Employing equipment set up as in FIG. 1, a feedstock obtained as a high vacuum residuum from a paraffinic crude oil was processed according to the present method.

The characteristics of the feedstock were:

| | |
|---|---:|
| ° API | 6.7 |
| Ramsbottom carbon, weight percent | 19.8 |
| Carbon, weight percent | 73.25 |
| Hydrogen, weight percent | 11.23 |
| Nitrogen, weight percent | 0.77 |
| Sulphur, weight percent | 3.65 |
| Asphaltenes in $nC_5$, weight percent | 19.33 |
| Metals, p.p.m.: | |
| Ni | 53.0 |
| V | 133.0 |
| Viscosity S.F., sec.: | |
| 210° F. | 1225 |
| 250° F. | 323 |
| 275° F. | 162 |
| Penetration 100 g./5 sec./25° C. | 73 |

The feedstock was combined with a mixture of pentanes in line 2 and was introduced into the contactor 3. The pentanes were predominantly n-pentane with minor amounts of isopentane and some hexane. The ratio of feedstock/solvent in contactor 3 was 1/3 (v./v.).

An asphaltene solution from tank 9 was fed via line 8 into the intermediate, mixing zone of contactor 3 at a rate of 2% by weight asphaltene based on the weight of the feedstock.

Soluble material as phase I was transferred via line 10 into evaporation 11 where the solvent was separated from the soluble material.

The characteristics of the soluble material in line 12 were:

| | |
|---|---|
| °API | 12.2 |
| Ramsbottom carbon, weight percent | 13.5 |
| Carbon, weight percent | 73.35 |
| Hydrogen, weight percent | 12.31 |
| Nitrogen, weight percent | 0.67 |
| Sulphur, weight percent | 3.34 |
| Asphaltenes in $nC_5$, weight percent | 6.3 |
| Metals, p.p.m.: | |
| Ni | 18.0 |
| V | 75.0 |
| Viscosity S.F. 210° F., sec. | 70.0 |

The insoluble material of phase III was transferred via line 14 into tank 9 where the residual normal pentane was evaporated and passed to tank 5.

The characteristics of the insoluble material are given in the following table:

| | |
|---|---|
| °API | 3.6 |
| Carbon, weight percent | 73.80 |
| Hydrogen, weight percent | 9.01 |
| Nitrogen, weight percent | 1.22 |
| Sulphur, weight percent | 5.00 |
| Asphaltenes in $nC_5$, weight percent | 78.0 |
| Metals, p.p.m.: | |
| Ni | 188.0 |
| V | 541.0 |
| Softening point, °F. | 320.0 |

The soluble material, being much reduced in asphaltenes and metals, can be used as feed to any hydro-cracking or hydrogenation processes and the insoluble material can be utilized in the elaboration of asphaltenes, carbon black, activated carbon, and the like.

Figure 2:
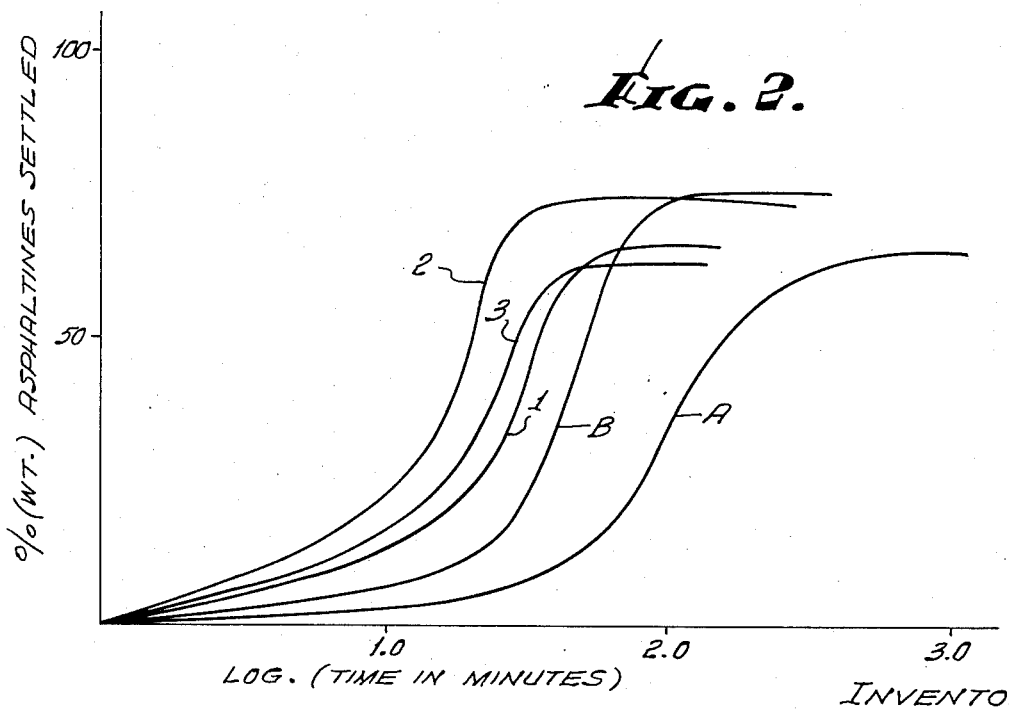
FIG. 2 is a plot of sedimentition velocities of asphaltenes under different conditions including those according to the present invention.

The sedimentation velocity for the asphaltenes within contactor 3 under condition of the above example, i.e. 3/1 dilution and 2% added asphaltenes, is shown by curve 1 in FIG. 2 of the attached drawings. The result of adding solvent/diluent at a volume ratio of 4/1 is shown by curve 2. The result of adding asphaltene at the 4% by weight level rather than 2% is shown by curve 3.

For comparison of sedimentation rates with dilution but without addition of asphaltenes, there are presented curves A and B, the former employing dilution at 3/1 and the latter at 4/1 without asphaltene addition but otherwise like the systems providing curves 1, 2 and 3.

It will be noted that the addition of particulate matter in the form of asphaltenes dramatically improves sedimentation velocities for asphaltenes in a feedstock and that the effect is relatively more pronounced at higher dilutions and higher particulate matter levels.

EXAMPLE 4

Example 1 is repeated employing clay having an average particle size between 250 and 300 mesh. Equivalent results are obtained.

We claim:

1. Method of processing heavy crude oil feedstocks containing above 25 p.p.m. metallic catalyst poisons and above 2% by weight asphaltenes to obtain a desired fraction useful in catalytic cracking operations including intimately blending the feedstock with from 2 to 10 volumes per volume of feedstock of a liquid hydrocarbon solvent for said fraction selected from the group consisting of pentane, hexane, heptane, octane, benzene, toluene, and xylene, passing the solvent blended feedstock into a vertically extended processing zone to a feed point intermediate the top and bottom of the zone, adding from 1 to 5% by weight based on the feedstock weight of particulate matter dispersed in said solvent and less than 200 mesh in particle size to the zone at a point above said feed point and below the top of said zone, agglomerating said metallic poisons and asphaltenes with said particulate matter to gravity separate to the bottom of said zone from the diluted feedstock without turbulence, taking a solution of the desired fraction in said solvent from the top of said zone, taking agglomerated metallic poisons and asphaltenes from the bottom of said zone, recovering said solvent from said solution, recycling the solvent to fresh feedstock and recycling separated asphaltenes less than 200 mesh in particle size to the processing zone as particulate matter.

2. Method according to claim 1 in which said particulate matter comprises asphaltenes in the particle size range of 200 to 350 mesh and is added to the feedstock with from 3 to 6 volumes per volume of feedstock of said solvent.

References Cited

UNITED STATES PATENTS

| | | | |
|---|---|---|---|
| 2,793,168 | 5/1957 | Corneil et al. | 208—309 |
| 3,423,308 | 1/1969 | Murphy | 208—251 |
| 3,511,774 | 5/1970 | Long et al. | 208—251 |

HERBERT LEVINE, Primary Examiner

U.S. Cl. X.R.

208—309